(No Model.) 2 Sheets—Sheet 1.

G. LANGER.
STREET SPRINKLER.

No. 497,074. Patented May 9, 1893.

Witnesses
J. P. Vastine
J. B. Clark

Inventor
G. Langer
By his Attorneys
Keller & Starek (No Model.) 2 Sheets—Sheet 2.

G. LANGER.
STREET SPRINKLER.

No. 497,074. Patented May 9, 1893.

Witnesses
J. P. Vastine,
J. B. Clark.

Inventor
G. Langer.
By his Attorneys
Keller & Starek

UNITED STATES PATENT OFFICE.

GOTTHOLD LANGER, OF ST. LOUIS, MISSOURI, ASSIGNOR TO H. G. STIEBEL, JR., AND A. C. STIEBEL, OF SAME PLACE.

STREET-SPRINKLER.

SPECIFICATION forming part of Letters Patent No. 497,074, dated May 9, 1893.

Application filed November 25, 1892. Serial No. 453,145. (No model.)

*To all whom it may concern:*

Be it known that I, GOTTHOLD LANGER, of the city of St. Louis, State of Missouri, have invented certain new and useful Improvements in Street-Sprinklers, of which the following is a full, clear, and exact description, reference being had to the accompanying drawings, forming a part hereof.

My invention relates to improvements in street sprinklers and consists in the novel arrangement and combination of parts more particularly set forth in the specification and designated in the claims.

Figure 1:
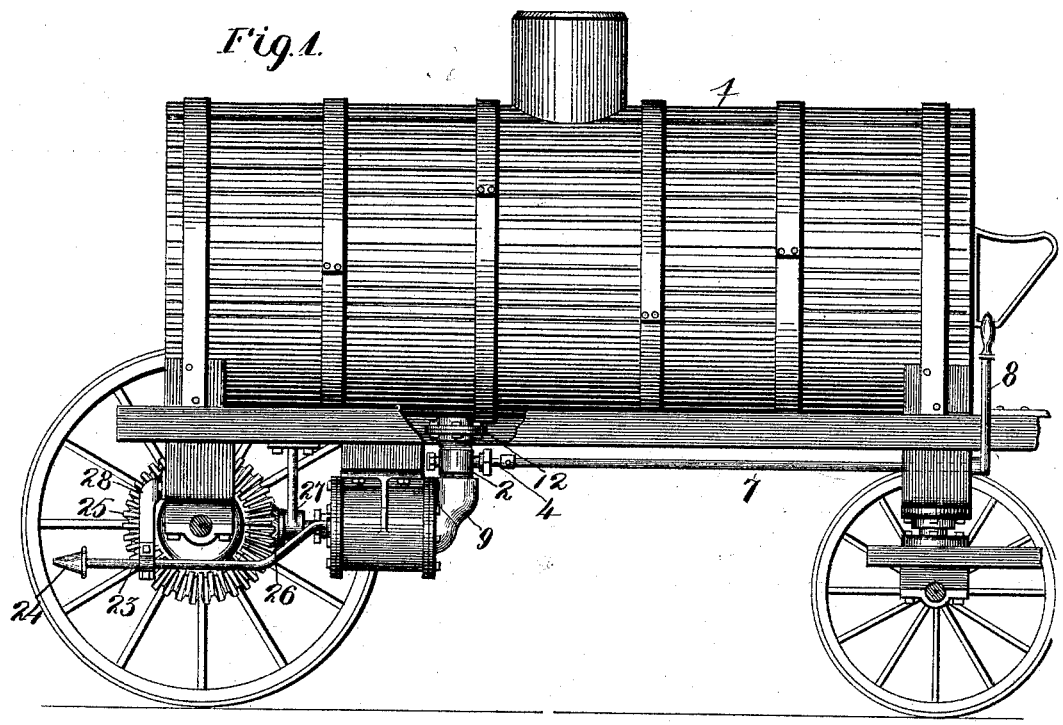
Figure 2:
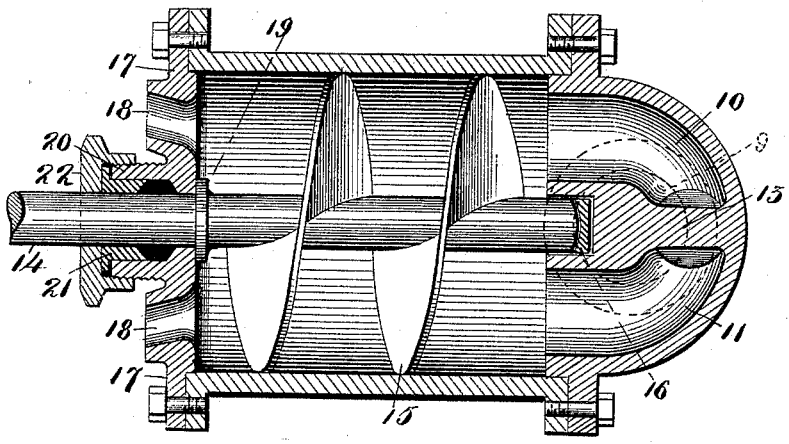
Figure 3:
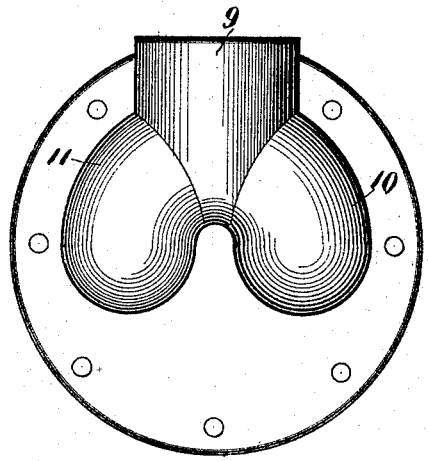
Figure 4:
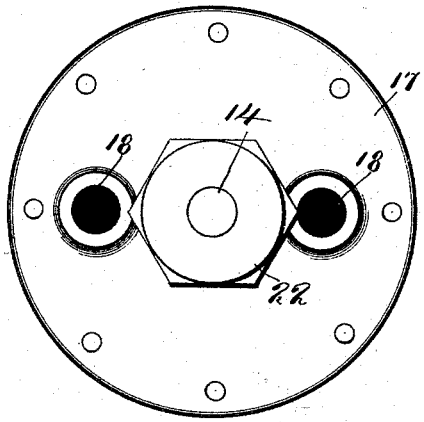
Figure 5:
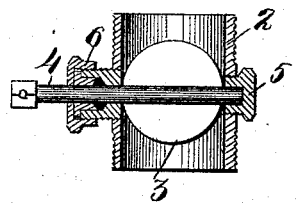

In the drawings Figure 1 is a side elevation of a tank with my improved sprinkler attached. Fig. 2 is a section of the cylinder containing the spiral conveyer showing also the double passage for the conveyance of water at either side of the axis of the conveyer. Fig. 3 is a view of the front of the conveyer-cylinder. Fig. 4 is a view of the rear portion thereof; and Fig. 5 is a section of the pipe containing the valve by which the water from the tank is regulated in its flow into the conveyer-cylinder.

My present invention contemplates a sprinkler wherein the water from the tank is fed to the sprinkling device by a conveyer so constructed that the same is always filled by a head of water from the tank containing the same, and wherein the inlet and the outlet openings of the conveyer are so proportioned that the conveyer-cylinder will always fill readily under a hydrostatic head, and thus facilitate the forcing of the water by the conveyer within the cylinder to the point where utilized; and to this end I have devised an apparatus the details of which I will now describe.

Referring to the drawings, 1 represents the ordinary tank within which the water is confined. At the bottom and in the rear portion of the tank is an exit pipe 2 for the water, the quantity of the latter being controlled by the valve 3 (shown in Fig. 5). The said valve is mounted along its diameter on the rod 4, the said rod passing through suitable stuffing caps 5 and 6 at either side of the pipe. The said rod 4 is connected to a rod 7 at the bottom of the tank, and the rod 7 is in turn connected to the lever 8 at the front of the tank, and thus the valve 3 is controlled in any suitable mechanical manner from the front of the tank. The exit pipe 2 leads to a casting or head having a passage 9 communicating with the exit pipe 2, said passage 9 diverging into two passages 10 and 11 which latter enter the conveyer cylinder on either side of the axis of the spiral conveyer as more particularly shown in Fig. 2. It may be stated in passing that the exit pipe 2 is connected to the tank 1 by a suitable coupling 12 best shown in Fig. 1. By diverging as here described, the passages 10 and 11 leave a solid portion or rib 13 between them said rib serving as an abutment for the axis 14 of the spiral conveyer 15.

Within the socket of the rib in which the axis 14 turns is a block 16 generally of chilled steel to prevent wear of the socket at the end of the shaft of the conveyer. It may be stated in passing that the casting or head is flanged as is also the cylinder, and the respective flanges are secured together by bolts. At the opposite end of the conveyer-cylinder is secured also by suitable flanges and bolts, a cap piece 17 said cap having outlet openings 18 at opposite sides of the shaft 14. The shaft abuts against the cap along the flange 19 and the prolongation of the axis passes through a central screw-threaded nipple 20 projecting from the cap. Between the axis and the interior of the nipple is interposed the bushing 21, and finally a cap 22 secures said bushing in place by screwing said cap over the nipple, thus making a tight joint, as best shown in Fig. 2. The openings 18 lead to suitable exit pipes 23 (shown in Fig. 1) which latter communicate with any form of sprinkling device 24, as best shown in Fig. 1.

In my invention the conveyer-cylinder is below the center of gravity of the column of water confined within the tank 1, and the reason of this arrangement is obvious: As long as the valve 3 is open, whether fully or partially, the pressure of water on the blades of the conveyer will always be dependent upon the "head" of water confined within the tank 1, such pressure being in all instances a positive one, and one which will have a constant tendency to fill the conveyer-cylinder. In order that this positive pressure on the blades may be maintained during the operation of the device, that is, during the time the sprinkler is being drawn over the street or place to be sprinkled, I have so constructed the passages 10 and 11, that the areas of their combined cross section will be greater than the combined cross-sectional area of the openings 18, and consequently the volume of water delivered into the cylinder through the passages 10 and 11 will be greater than that withdrawn by the openings 18. Such a positive pressure upon the blades is necessary since under such a condition the intensity of the stream issuing from the sprinkler will be maintained. By this arrangement also, the work of the blades is decreased, their function being more properly to merely force the water supplied to them, than to furnish their own supply.

Keyed to the hind axle of the running gear is a bevel gear wheel 25, and meshing with the said gear wheel and fixed to the projecting end of the shaft 14 is a bevel gear pinion 26 by means of which motion is imparted to the spiral conveyer located within the cylinder.

Fastened to the body of the running gear and depending therefrom is a hanger 27 which supports the shaft 14 intermediate of the bevel pinion 26 and the conveyer-cylinder.

The exit pipes 23 are additionally supported by a hanger 28 fixed to the body of the running gear as best shown in Fig. 1.

It is to be borne in mind that the valve 3 in the exit pipe 2 serves merely to regulate the quantity of flow from the tank, and the "positive" effect referred to in the specification will be reduced to *nil* when said valve is completely closed.

I have laid much importance to the location of the conveyer-cylinder, viz., that it be below the center of gravity of the water in the tank. However, it would not be falling without the spirit of my invention if the said cylinder were located in any other relation with respect to the center of gravity of the body of water within the tank 1.

Having particularly described my invention, what I claim is—

1. A street sprinkler consisting of a tank having an outlet pipe at the bottom thereof, a regulating valve in said pipe, a conveyer-cylinder communicating with said outlet pipe, a spiral conveyer within said cylinder, outlet openings leading from the conveyer cylinder having a combined sectional area less than that of the inlet openings to the cylinder, and a sprinkling device connected with said outlet openings, substantially as set forth.

2. In a street sprinkler, a conveyer-cylinder having a suitable head, a passage communicating with said head, diverging passages leading from said passage, a solid rib having a socket formed between said diverging passages, a shaft carrying a conveyer supported within the socket formed in the rib, a cap secured to the opposite end of the conveyer-cylinder having a central passage for the reception of the opposite end of the shaft, and outlet openings in said cap, substantially as set forth.

3. In a street sprinkler, a conveyer-cylinder having a head, a solid rib within said head, diverging passages on either side of said rib communicating with the inlet end of the cylinder, a conveyer within the cylinder, and outlet openings at the opposite end of the cylinder, said openings having a proportionately less combined sectional area than the combined cross-sectional area of the diverging passages, substantially as set forth.

4. A street sprinkler consisting of a tank, a valve controlled outlet pipe at the bottom thereof, a passage 9 communicating with said outlet pipe, diverging passages 10 and 11 leading from said passage 9, a conveyer-cylinder having a head secured thereto, said head having a central solid rib separating the passages 10 and 11, a socket formed in said rib, a spiral conveyer within the cylinder having a shaft supported at one end within the socket formed in the rib, a cap secured at the opposite end of the cylinder, said shaft passing centrally through said cap, a collar on said shaft for limiting the movement of the same, outlet openings in the cylinder cap, said openings having a less cross-sectional area than that of the diverging passages 10 and 11, a bevel pinion at the outer end of the conveyer shaft, a bevel gear keyed to the running gear meshing with said pinion, substantially as set forth.

5. In a street sprinkler, a conveyer cylinder having inlet openings and outlet openings, the cross sectional area of the former being far in excess of the cross sectional area of the latter, said cylinder being located below the center of gravity of the water in the tank, substantially as set forth.

In testimony whereof I affix my signature in the presence of two witnesses.

GOTTHOLD LANGER.

Witnesses:
   EMIL STAREK,
   C. F. KELLER.